United States Patent Office 2,712,491
Patented July 5, 1955

2,712,491

PREPARATION OF AMMONIUM CYANATE FROM UREA

Leslie G. Boatright, Stamford, Conn., assignor to American Cyanamid Company, New York, N. Y., a corporation of Maine No Drawing. Application March 16, 1954, Serial No. 416,704

6 Claims. (Cl. 23—75)

This invention relates to a method of preparing ammonium cyanate. More particularly it relates to a method of preparing ammonium cyanate by conversion of urea.

It has been known for over a century that ammonium cyanate can be produced by the sublimation of urea. Whenever urea was heated sufficiently beyond its melting point to cause vaporization, the vapors that formed early in the heating process were known to condense to form some ammonium cyanate, among other things.

Through the decades scientists and technologists have tried to develop a good working process by means of which ammonium cyanate can be prepared commercially simply by heating urea. Urea and its reactions and transformations have probably been studied as fully as any other chemical compound in existence. Yet despite the tremendous work that has been done no one has yet produced the desired process. This is understandable since urea is a peculiar compound.

Urea melts at about 132° C. When the temperature is increased above the melting point urea begins to vaporize. However the vaporization is a complex thing. First the molten urea begins to lose ammonia. As a result of the ammonia being driven off there remain along with residual urea such compounds as biuret, triuret, cyanuric acid, ammeline, ammelide, and other deaminated products. Traces of $CO_2$ will be found in the $NH_3$ initially liberated on heating a mass of urea slowly at just above its melting point. On continued heating and particularly if the temperature is increased to about 150° C. to 200° C. then a part of the vapor can be condensed to yield small amounts of impure ammonium cyanate.

However, the vapors soon change their characteristics so that ammonium cyanate can no longer be condensed. Even in condensing the initial vapors it is often found that very little or no ammonium cyanate is produced; instead the sublimed solids are found to consist largely of urea. If however the vapors are condensed on a surface maintained at about 300° C., substantially pure cyanuric acid can be recovered from the condensed solids. Cyanuric acid is therefore, the only compound that has been isolated in substantially pure form as a result of heating urea.

These difficulties then have prevented the development of a process of making ammonium cyanate from urea to any extent beyond that of obtaining in the laboratory small quantities of impure ammonium cyanate from the initial vapors from a heated mass of urea.

It is an object of the present invention to supply a workable process that overcomes the above described difficulties.

To this end the invention contemplates continuously converting urea into vapor having a temperature of at least about 275° C.; this should be done rapidly. The vapor or at least a portion thereof is then condensed at a temperature below about 100° C. Thus-formed ammonium cyanate is then recovered.

Temperature control is of paramount importance in the process of the present invention. The urea must be heated so that it is swiftly converted to vapor. If the urea is vaporized too slowly, ammonia is lost and the composition of the vapor changes so that it is no longer suitable for the condensation of ammonium cyanate. If any of the urea, either in liquid or in vaporized form, is allowed to remain at a temperature between about 132° C. and 275° C. then deammoniated solids are left behind, or deposited from the vapor, and the vapor is enriched with ammonia. Apparently it is this loss of ammonia that in the past has prevented the condensation of ammonium cyanate from any urea vapor save that initially produced. Of course it must be the loss of $NH_3$ from the solids, and not the $NH_3$ enrichment of the vapor, which precludes $NH_4OCN$ sublimation on heating between 132° and 275° C.

The ammonia loss can be minimized by flashing the urea into a vapor as rapidly as possible. The mere heating of urea to a temperature slightly above its melting point of about 132° C. will not suffice. It has been found that the minimum temperature at which the urea must be converted to vapor is 275° C., with a preferred minimum of 300° C. If urea is heated at a temperature below the minimum 275° C. then ammonia is lost, insolubles build up and useful yields of ammonium cyanate cannot be obtained under these circumstances. It has been found that the upper time limit for heating the urea is about 15 seconds. If urea is converted to a vapor at a temperature of at least about 275° C. by heating the urea to be vaporized for more than about 15 seconds, then little or no ammonium cyanate can be condensed for the reasons described above.

This heating step can be carried out in several ways. Powdered urea can be blown through a heated chamber maintained at such a temperature that the urea to be vaporized changes to a vapor having a temperature of at least 275° C. within the 15 second maximum period. The molten urea may also be impinged on a hot plate in order to accomplish swift vaporization. Another alternative is to introduce urea in solid form into a vessel containing a heating medium maintained at a temperature of at least 275° C. This heating medium may be in the form of a finally divided solid such as white sand. It is desirable that the heating medium, whatever it may be, be amenable to agitation in order that the urea may be more swiftly disseminated and heated to the requisite temperature.

Another method consists in introducing either powdered urea or a spray of liquid urea into a bed, or stream, of a fluidized solid material at such a temperature that the urea is completely converted to vapor having a temperature above 275° C., separating the vapor from the fluidized solid, and recirculating the latter through a furnace or heater.

It is very important that a temperature above 275° C. be achieved quickly and, since the heat required to go from liquid urea at 132° C. to vapor at 325° C. is about 54 K. cal per gram mole of urea, very good heat transfer must be provided.

The urea vapor should not be raised to a temperature above about 500° C., with 450° C. a preferred maximum. Above these temperatures the formation of HCN and cyanides will minimize the ammonium cyanate yield.

It will be apparent that the process of the present invention must operate as a continuous process rather than a batch process. The temperature requirements of the present process are such that a batch process renders the transformation inoperable; the temperature cycles of a batch process defeat the present invention. It is entirely possible that lack of recognition of the necessity for having a continuous process in the conversion of urea to ammonium cyanate has impeded the workers in the prior art.

Once the urea has been vaporized at the proper temperature the vapors or at least a portion thereof must then be cooled under the proper conditions so as to condense ammonium cyanate.

As mentioned earlier if the condensation of urea vapors is carried out at a temperature of about 300° C. substantially pure cyanuric acid will be formed. If the condensation is carried out in the temperature range of about 100°–300° C. then mixtures of urea, cyanuric acid, and other compounds will be formed. Toward the upper end of the 100°–300° C. range the condensed mixture will be predominantly cyanuric acid. Toward the lower end, that is near 100° C. urea will predominate. It is only when the condensation temperature is maintained below about 100° C. that ammonium cyanate will be formed. Experiments show that when urea vapor formed as described earlier is condensed on a wall maintained at 105° C. a white powder is obtained having an approximate composition of 87% urea, 8% cyanuric acid, the remainder being ammeline and ammelide; no ammonium cyanate is present. If however urea vapors are condensed on a wall maintained at 95° C. the composition of the powder is approximately 54% ammonium cyanate, 34% urea, 2% cyanuric acid and the balance a mixture of ammonium carbonate, ammelide and ammeline. A powder of substantially the same composition is deposited at 100° C. However in the range 100°–105° C. the ammonium cyanate content rapidly falls off to zero as the temperature rises above 100° C.

While the upper limit of the condensation temperature is fixed at about 100° C., the lower limit may vary considerably. In order to minimize contamination with ammonium carbamate it may be desirable to maintain the temperature above 52° C. which is the temperature at which pure ammonium carbamate vapor condenses at atmospheric pressure. If however the vapors are diluted with other gases such as air or nitrogen, condensation temperature can be as low as about 35° C. or lower. Since the temperature of condensation of ammonium carbamate is a function of the partial pressures of $CO_2$ and $NH_3$ in the vapor it can readily be seen that the condensation of ammonium carbamate is prevented when these partial pressures are lowered, as by dilution. In any case, unlike impurities such as cyanuric acid, the ammonium carbamate when present is not harmful to the ammonium cyanate; ammonium carbamate exerts no deleterious effects in the vast majority of the uses to which ammonium cyanate may be put. For this reason the preferred temperature of condensation is about 40° C.

The condensation of the urea vapors may be carried out by any convenient means. The urea vapors may impinge on metallic walls maintained at the proper temperature; in this case the condenser should be equipped with scrapers in order to remove the ammonium cyanate from the walls as it is formed. As an alternative the vapors may be condensed on a wet wall condenser wherein the ammonium cyanate is continuously washed from the walls of the condenser with an inert liquid such as kerosene or other hydrocarbon fraction having a high boiling point, say above about 200° C. As still another alternative the urea vapors may be condensed directly in a fluid stream maintained at the proper temperature. The fluid may be a gas or preferably it is a liquid hydrocarbon such as described above.

The process of the present invention is best carried out at atmospheric pressure. However pressures slightly above or below atmospheric pressure do not adversely affect the conversion. The process functions very well up to pressures of about 100 pounds per square inch. At this pressure melamine contamination of the ammonium cyanate product begins to be noticeable. At pressures up to about 100 p. s. i. melamine formation if any can be readily depressed by bleeding air into urea vapor. Other inert diluents such as nitrogen will accomplish the same purpose. However above about 100 p. s. i. the depression of melamine formation begins to become too cumbersome to be practical.

As further illustrations of the process of the present invention the following examples are given by way of illustration and not of limitation.

*Example 1*

To a flask equipped with stirrer, heating mantle and thermocouple is added 200 grams of white sand. A jacketed outlet, heated and maintained at 300° C. connects the flask with a square stainless steel box immersed in a water bath maintained at a temperature of 35° C.; the box serves as a condenser and is equipped with a hand scraper. An outlet from the box leads through a Dry Ice trap.

The agitator is started and the sand heating medium is brought to a temperature of 350° C. Ammonia at room temperature at the rate of 2 liters per minute is passed through the system. Over a period of six hours, 200 grams of urea are fed into flask by means of a screw conveyor. The walls of the condenser are periodically scraped in order to remove solids therefrom.

At the end of the run 181.5 parts of solids are recovered from the condenser; the solids analyzed 91% ammonium cyanate, 8% ammonium carbamate. An additional 6.5 parts of ammonium cyanate is recovered from the Dry Ice trap. The conversion of urea to ammonium cyanate for the entire run is 86%.

*Example 2*

The outlet of a screw conveyor empties into the top of a heater consisting of a two-foot vertical section of half-inch type 304 stainless steel pipe. A radiant electric furnace supplies heat to the top 20 inches of the heater. The outlet of the heater is immersed in a bath of kerosene maintained at a temperature of 50° C.; the bath is constantly agitated.

Ammonia, at the rate of 2 liters a minute, is fed through the system. 200 parts of powdered urea (60% through 100 mesh) is fed into the heater over a 7½ hour period. The temperature at the outlet of the heated portion is 300° C.

At the end of the run the kerosene slurry was filtered. 191 parts of solids were recovered having an ammonium cyanate content of 95%. The conversion of urea to ammonium cyanate is 91%.

I claim:

1. In a method for preparing ammonium cyanate which comprise the steps of: continuously converting urea to a vapor in a heated zone, continuously withdrawing the latter vapor to a cooling zone maintained at a temperature below 100° C. and recovering ammonium cyanate, the improvement in combination therewith comprising: flash vaporizing urea within a period not to exceed about 15 seconds in a heated zone maintained at a temperature of at least 275° C.

2. In a method for preparing ammonium cyanate which comprise the steps of: continuously converting urea to a vapor in a heated zone, continuously withdrawing the latter vapor to a cooling zone maintained at a temperature of from about 35° C. to about 100° C. and recovering ammonium cyanate, the improvement in combination therewith comprising: introducing powdered urea in a heated zone maintained at a temperature of at least 275° C. but not more than 500° C., and flash vaporizing said urea within a period not to exceed about 15 seconds.

3. In a method for preparing ammonium cyanate which comprise the steps of: continuously converting urea to a vapor in a heated zone, continuously withdrawing the latter vapor to a cooling zone maintained at a temperature of from about 35° C. to about 100° C. and recovering ammonium cyanate, the improvement in combination therewith comprising: introducing powdered urea into a zone containing agitated sand maintained at a temperature of 350° C., and flash vaporizing said urea within a period not to exceed about 15 seconds.

4. In a method for preparing ammonium cyanate which comprise the steps of: continuously converting urea to a vapor in a heated zone, continuously withdrawing the latter vapor to a cooling zone maintained at a temperature of from about 35° C. to 100° C. and recovering ammonium cyanate, the improvement in combination therewith comprising: introducing powdered urea diluted with an inert gaseous medium into a heated zone maintained at a temperature of at least 275° C. but not more than 500° C., and flash vaporizing said urea within a period not to exceed about 15 seconds.

5. The method according to claim 4 in which the inert gaseous medium is selected from the group consisting of ammonia, nitrogen and air.

6. The method according to claim 4 in which the inert gaseous medium is ammonia.

References Cited in the file of this patent

Williams, "Cyanogen Compounds" 2nd ed., pages 48, 49 and 72 Edward Arnold and Co., London, 1948.

Werner, "The Chemistry of Urea," pages 23–30, Green and Co. N. Y. C. 1923.